(12) United States Patent  
Karenos et al.

(10) Patent No.: US 8,589,536 B2  
(45) Date of Patent: Nov. 19, 2013

(54) NETWORK MONITORING SYSTEM

(75) Inventors: Kyriakos Karenos, New York, NY (US); Hui Lei, Scarsdale, NY (US); Wim De Pauw, Scarborough, NY (US)

(73) Assignee: International Business Machines Corporation, Armonk, NY (US)

( * ) Notice: Subject to any disclaimer, the term of this patent is extended or adjusted under 35 U.S.C. 154(b) by 202 days.

(21) Appl. No.: 12/848,316

(22) Filed: Aug. 2, 2010

(65) Prior Publication Data

US 2012/0030344 A1 Feb. 2, 2012

(51) Int. Cl.  
*G06F 15/173* (2006.01)

(52) U.S. Cl.  
USPC ........... 709/224; 709/223; 709/230; 709/249; 709/250

(58) Field of Classification Search  
USPC .......................... 709/224, 223, 230, 249, 250  
See application file for complete search history.

(56) References Cited

U.S. PATENT DOCUMENTS

| | | | |
|---|---|---|---|
| 7,406,539 B2 | 7/2008 | Baldonado et al. | 709/240 |
| 7,421,660 B2 | 9/2008 | Charnock et al. | 715/751 |
| 7,617,281 B2 | 11/2009 | Manion et al. | 709/204 |
| 8,078,708 B1 * | 12/2011 | Wang et al. | 709/223 |
| 2002/0124115 A1 | 9/2002 | McLean et al. | 709/310 |
| 2005/0086469 A1 * | 4/2005 | Dunagan et al. | 713/163 |
| 2005/0251556 A1 | 11/2005 | Ginis et al. | 709/206 |
| 2005/0256905 A1 | 11/2005 | Gruhl et al. | 707/104.1 |
| 2006/0136256 A1 | 6/2006 | Roots et al. | 705/1 |
| 2006/0224668 A1 | 10/2006 | Ginis | 709/204 |
| 2006/0253418 A1 | 11/2006 | Charnock et al. | 707/1 |
| 2008/0104225 A1 | 5/2008 | Zhang et al. | 709/224 |
| 2008/0244025 A1 | 10/2008 | Ginis et al. | 709/206 |
| 2008/0298294 A1 * | 12/2008 | Gonsa et al. | 370/312 |
| 2009/0113047 A1 | 4/2009 | Fehners | 709/224 |
| 2010/0208616 A1 * | 8/2010 | Schieder et al. | 370/254 |
| 2011/0035455 A1 | 2/2011 | Sharma | 709/206 |
| 2011/0125921 A1 * | 5/2011 | Karenos et al. | 709/240 |
| 2011/0243131 A1 * | 10/2011 | Amir et al. | 370/390 |
| 2011/0282804 A1 * | 11/2011 | Shutt | 705/36 R |
| 2011/0313832 A1 | 12/2011 | Herbrich et al. | 705/14.16 |

OTHER PUBLICATIONS

Chockler, G. et al.; Constructing Scalable Overlays for Pub-Sub with Many Topics, PODC'07, Aug. 12-15, 2007, Portland, Oregon, USA.  
He Yan et al.; BGPmon: a real-time, scalable, extensible monitoring system, 2009.  
Garces-Erice, L. et al.; A Flexible and Scalable Message Broker for Sensor Network Integration, COMSWARE '09, Jun. 16-19, Dublin, Ireland.  
Eisenhauer, G. et al.; Event-based Systems: Opportunities and Challenges at Exascale, DEBS '09 Nashville, TN.  
Pesonen, Liw. et al.; Encryption-Enforced Access Control in Dynamic Multi-Domain Publish/Subscribe Networks, DEBS '07, Jun. 20-22, 2007 Toronto, Ontario, Canada.

* cited by examiner

*Primary Examiner* — Lan-Dai T Truong  
(74) *Attorney, Agent, or Firm* — Ido Tuchman; Preston J. Young

(57) ABSTRACT

A system to monitor an overlay network may include a plurality of publishers, a plurality of subscribers, and a plurality of brokers. The system may also include an overlay network linking the publishers, the subscribers, and the brokers. The overlay network includes a first computer network having a first network protocol carried by a second computer network having a second network protocol. The system may further include an inspection unit to monitor message topics sent over the overlay network amongst the publishers, the subscribers, and the brokers.

20 Claims, 19 Drawing Sheets

NETWORK MONITORING SYSTEM

BACKGROUND OF THE INVENTION

1. Field of the Invention

The invention relates to the field of computer systems, and, more particularly, to visualization systems of such.

2. Description of Background

Modern enterprises and organizations increasingly span across multiple geographical locations. At the same time, they collaborate with more and more other enterprises and organizations, resulting in a complex system of operational units. These units are usually heterogeneous and independent. Message Oriented Middleware (MOM) is the messaging infrastructure that allows the various disparate units to achieve seamless and federated communication.

Publish/subscribe messaging has become a central communication paradigm in many MOMs. Its indirect and loose coupling between sending endpoints (e.g., publishers) and receiving endpoints (e.g., subscribers) enables dynamic interoperation as well as scalable service provisioning. Typically, users of a specific location or operational unit form a local messaging domain and are served collectively by a dedicated publish/subscribe broker. Brokers at different locations are then interconnected, resulting in a Publish/Subscribe Broker Overlay Network across a potentially wide area. The central role of the broker overlay network is to route messages across local messaging domains. Messages published to a local broker flow through the broker overlay network via an overlay path to finally reach a different subscribing broker where they are delivered to the subscriber(s) in that broker's local messaging domain.

Publish/subscribe is a messaging paradigm that differs from traditional point-to-point communications in the sense that message senders and message receivers may not be directly aware of each other. Instead, messages are associated with a specific "topic" that represents a common communication pipe. Such systems typically interconnect publishers and subscribers across several offices, geographical locations, or even across multiple organizations. To achieve the above requirement, each functional unit is served by a messaging broker, which handles the reception and delivery of messages within a particular unit. The actual clients that publish and subscribe to topics are called messaging clients. Several clients can be associated with a messaging broker and publish or subscribe to a particular topic. The various messaging brokers are then interconnected over the physical network in an overlay. A link between two brokers is called an overlay link and corresponds to an underlying physical connection between the brokers, such as an Internet path, a Virtual Private Network (VPN) connection, and/or the like.

SUMMARY OF THE INVENTION

According to one embodiment of the invention, a system to monitor an overlay network may include a plurality of publishers, a plurality of subscribers, and a plurality of brokers. The overlay network includes a first computer network having a first network protocol carried by a second computer network having a second network protocol. The system may also include an overlay network linking the publishers, the subscribers, and the brokers. The system may further include an inspection unit to monitor message topics sent over the overlay network amongst the publishers, the subscribers, and the brokers.

The system overlay network may include domain groupings. The domain groupings may be browsed by a Uniform Resource Identifier based navigation, hierarchical navigation, and/or collapsible domains.

The inspection unit may collect statistics based upon the message topics. The statistics may be collected per domain and/or domain groupings. The statistics may be collected over the overlay network.

The system may also include an application programming interface to provide monitoring filtering and grouping across domains. The application programming interface may be client-side based and data may be aggregated client-side.

The filtering is based upon topic only, subscriber topics, publisher topics, particular end-to-end path, and/or particular multipath. The application programming interface may provide alerts based upon special events.

Another aspect of the invention is a method to monitor an overlay network. The method may include linking publishers, subscribers, and brokers via an overlay network. The method may also include monitoring message topics sent over the overlay network amongst the publishers, the subscribers, and the brokers.

The method may further include organizing the overlay network into domain groupings that can be browsed by Uniform Resource Identifier based navigation, hierarchical navigation, and/or collapsible domains. The method may additionally include collecting statistics based upon the message topics gathered over the overlay network.

The method may also include filtering and grouping across domains the monitoring via an application programming interface. The method may further include filtering based upon topic only, subscriber topics, publisher topics, particular end-to-end path, and/or particular multipath. The method may additionally include providing alerts based upon special events and the application programming interface.

Another aspect of the invention is a computer readable program codes coupled to tangible media to monitor an overlay network. The computer readable program codes may be configured to cause the program to link publishers, subscribers, and brokers via an overlay network. The computer readable program codes may also monitor message topics sent over the overlay network amongst the publishers, the subscribers, and the brokers.

DETAILED DESCRIPTION OF THE INVENTION

The invention will now be described more fully hereinafter with reference to the accompanying drawings, in which preferred embodiments of the invention are shown. Like numbers refer to like elements throughout, like numbers with letter suffixes are used to identify similar parts in a single embodiment, and letter suffix lower case z is a variable that indicates an unlimited number of similar elements.

Figure 1:
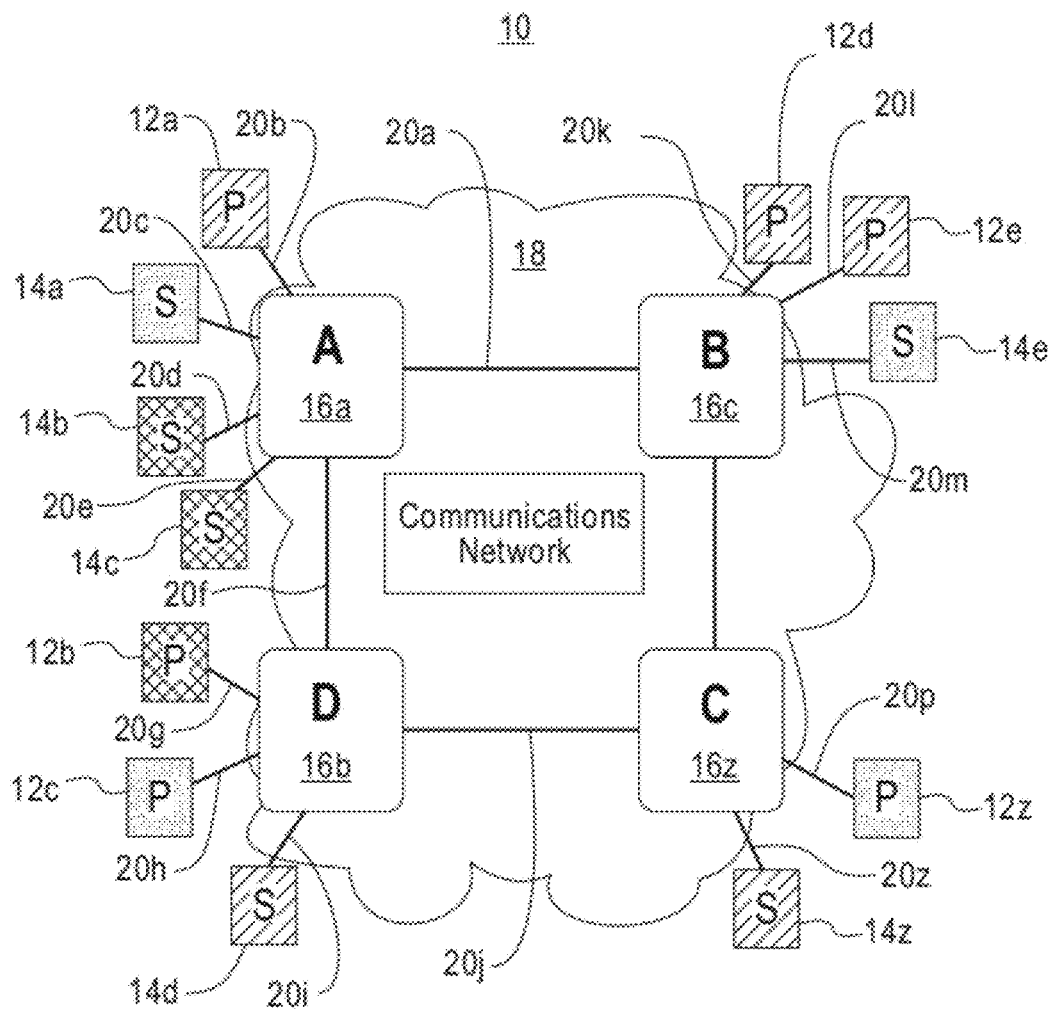
FIG. 1 is a schematic block diagram of a system to visually represent a network in accordance with the invention.

With reference now to FIG. 1, an example system 10 to visually represent a network in a computer system in accordance with the present invention is initially described. The system 10 is a programmable apparatus that stores and manipulates data according to an instruction set as will be appreciated by those of skill in the art.

According to one embodiment, a system 10 is a publish/subscribe communications paradigm that visually represents a network. The system 10 includes any number of publishers 12a-12z, subscribers 14a-14z, and/or brokers 16a-16z. Each publisher 12a-12z, subscriber 14a-14z, and/or broker 16a-16z is a computer processing node as will be appreciated by those of skill in the art. Any of the computer processing nodes can be a respective publisher 12a-12z, subscriber 14a-14z, and/or broker 16a-16z at any given time.

The system 10 includes a communications network 18, which enables a signal to travel anywhere outside of the system as well as between publishers 12a-12z, subscribers 14a-14z, and/or brokers 16a-16z over communications links 20a-20z. The communications network 18 is wired and/or wireless, for example. The communications network 14 is local and/or global with respect to system 10, for instance.

The broker 16a-16z visually represents on the communications network 18 a relationship between the publisher 12a-12z and the subscriber 14a-14z based upon a topic associated with the publisher, the subscriber, a routing mesh that the topic travels, and/or the communications links 20a-20z between the publisher and subscriber. In other words, any of the foregoing can be represented on the visual representation at any given time.

Figure 2:
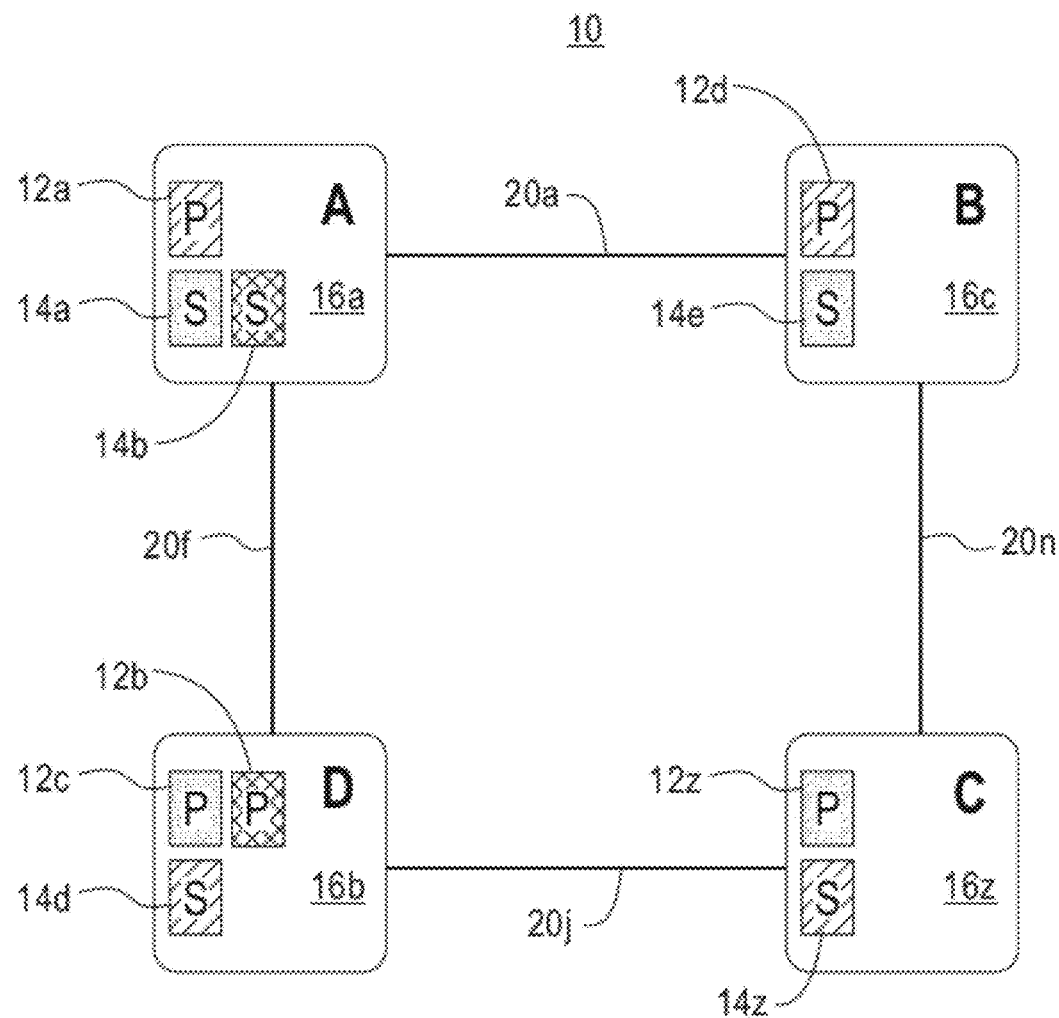
FIG. 2 is a schematic block diagram of one embodiment of the system in FIG. 1.

For instance, FIG. 2 illustrates a system similar to FIG. 1. However, the topics are now represented as color-coded rectangles inside their respective broker nodes 16a-16z. Publication topics are shown at the upper half of the broker node 16a-16z, and subscription topics are shown at the lower half of the broker node. The black lines between the brokers 16a-16z represent the links 20a-20z of the overlay network. The overlay network is a computer network which is built on top of another computer network. In a particular configuration, the overlay network includes a first computer network having a first network protocol carried by a second computer network having a second network protocol. Even though FIG. 2 now shows the publication and subscription topics for each of the brokers 16a-16z, it does not show how messages are routed from publishers 12a-12z to subscribers 14a-14z. Adding the routes 22a-22z, e.g. routing mesh, for the messages, determined by messaging middleware, provides the picture shown in FIG. 3. As can be seen from this figure, both brokers 16a and 16c publish the topic colored in blue. The blue lines show how messages for this blue topic travel across the overlay network. This diagram can give a user more insight into the effects of broken network links. However, for a topic with M publishers and N subscribers, there may be as many as M×N topic paths. As was already evident from FIG. 3, this representation does not scale well for anything but the simplest layouts.

As illustrated in this embodiment, many paths may exist between multiple publishers 12a-12z and multiple subscribers 14a-14z on a specific topic. In particular, each publisher 12a-12z creates a tree-like routing structure toward its subscribers 14a-14z. There may be multiple publishers 12a-12z on a particular topic and hence multiple tree structures, intermingled and potentially using several common overlay links to deliver messages. Therefore, the routing structure for a topic in general is a routing mesh, in contrast with traditional source-destination paths. Consequently, a broker 16a-16z is programmed to forward messages based on their topics rather than their final destinations.

Figure 3:
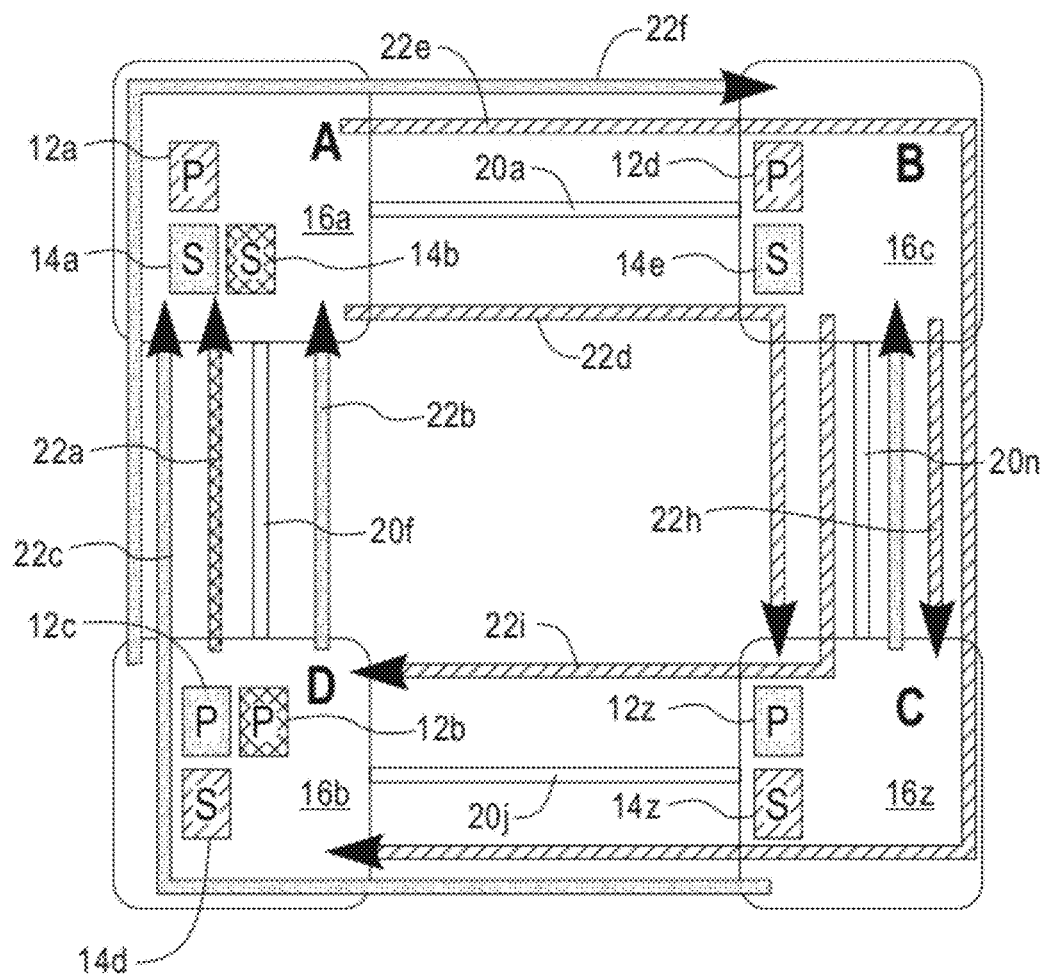
FIG. 3 is a schematic block diagram of one embodiment of the system in FIG. 2.
Figure 4:
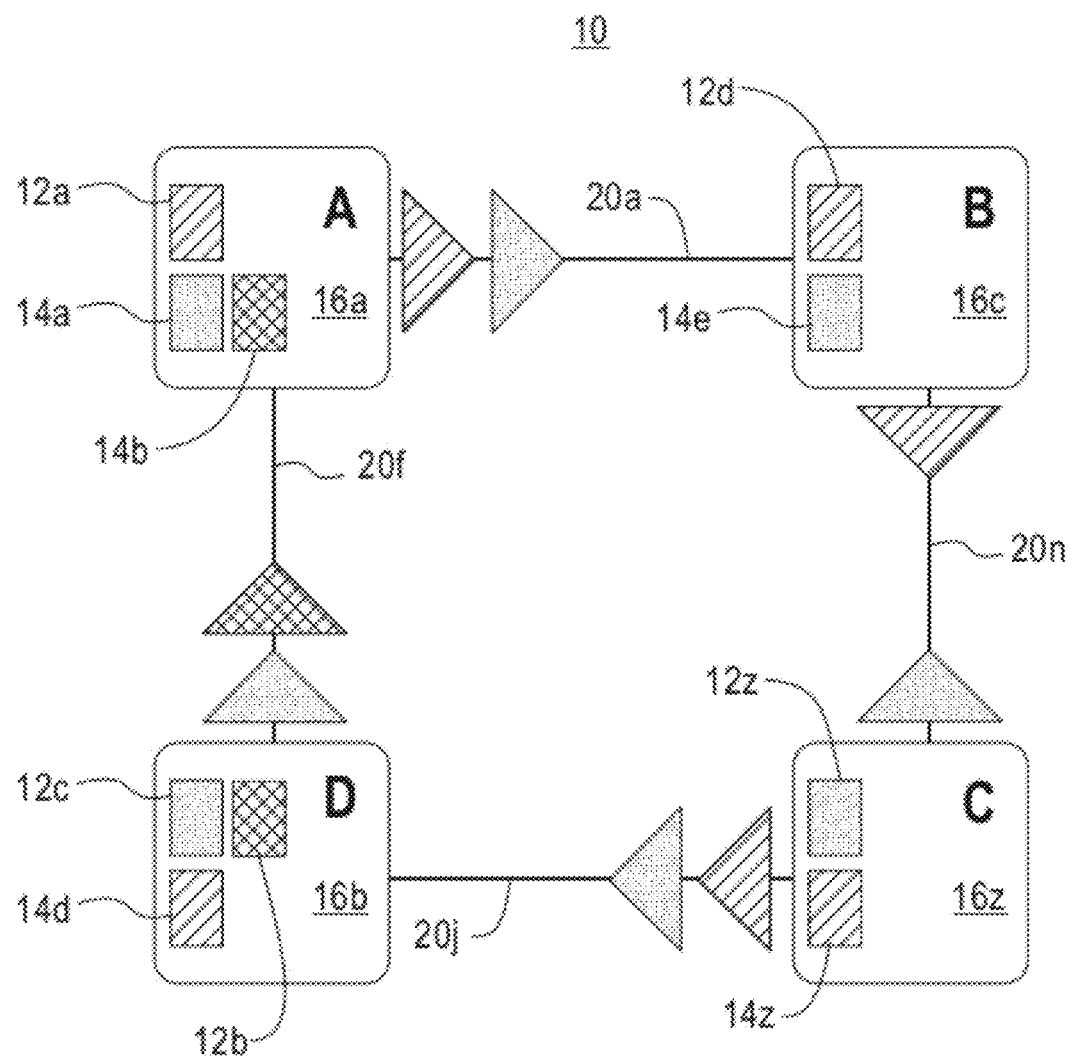
FIG. 4 is a schematic block diagram of one embodiment of the system in FIG. 3.

In one embodiment and with reference to FIG. 4, system 10 uses a simpler graphical syntax, which aims at cleanly distinguishing the forwarding decisions taken at each broker 16a-16z, as they pertain to each topic. Instead of explicitly drawing the paths that messages follow to get from publishers 12a-12z to subscribers 14a-14z, system 10 uses arrowheads, each representing a topic, on the overlay links. An arrowhead on an overlay link indicates that messages for a specific topic are sent across the link. The color of a topic is determined by its name, using a color-hashing scheme. Overlay links can carry topics in either direction, as shown in FIG. 4. Obviously, this representation is much simpler than the one in FIG. 3 and scales out to hundreds of nodes. It also highlights the topics of messages that are carried over links between brokers 16a-16z.

However, by simplifying the visual representation of the message routes from FIG. 3 and transforming it into FIG. 4, some information may be lost. For example, FIG. 3 shows that blue topic messages published by broker 16a went to broker 16z as well as to broker 16b. The representation in FIG. 4 may be ambiguous about the precise origin and endpoint of messages with the blue topic. However, system 10 enables a user to interact with the system to gradually untangle the routing mesh to reveal specific paths between individual publishers 12a-12z and subscribers 14a-14z as described later.

In one embodiment, the broker 16a-16z visually represents a topology on the communications network 18 of the publisher 12a-12n, the subscriber 14a-14z, the broker 16a-16z, the path flow 22a-22z that the topic travels, and/or the communications links 20a-20z between the publisher and subscriber. The topology may be an undirected graph layout such as a spring model, e.g. dot/neato, an absolute geographic location model, and/or the like.

Laying out a topology as simple as the one shown in FIG. 4 is relatively straightforward. For more realistic networks, system 10 offers a number of layouts to users, depending on the nature of the network. For messaging systems that are mostly located in one geographic location (e.g. in the same building), each broker 16a-16z and its applications usually corresponds to a certain business role, for example, purchase approvals, invoice processing, etc. In this case, system 10 can layout the topology of broker 16a-16z nodes using classic graph layout algorithms, based on space efficiency, minimal crossings, niceness of the layout, and/or the like.

Figure 5:
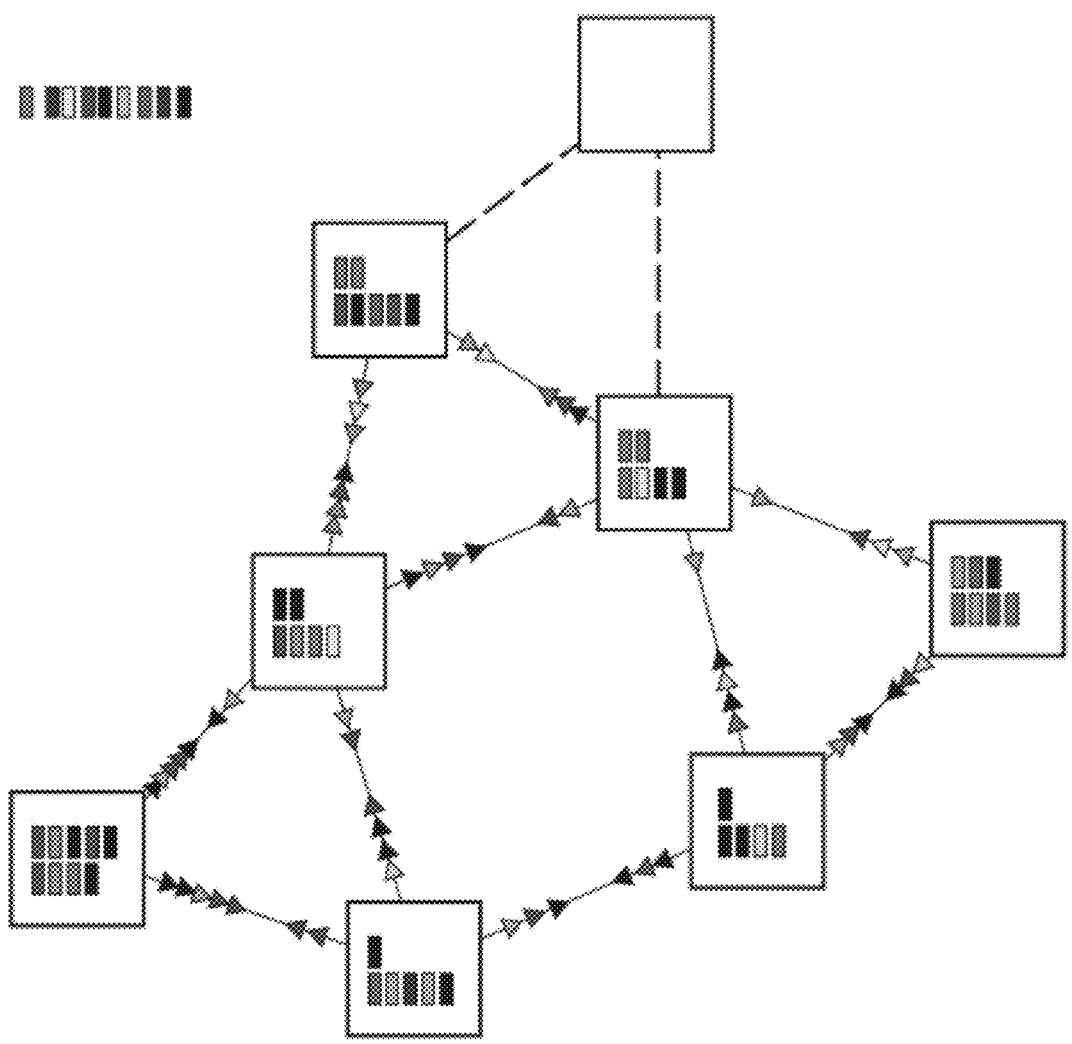
FIG. 5 is a schematic block diagram of one embodiment of the system in FIG. 4.

FIG. 5 illustrates a screenshot of a layout using a spring model where the overlay network has 8 messaging brokers 16a-16z. Each broker 16a-16z node shows its publication topics (upper half) and its subscription topics (lower half). Topics for messages on the network links are shown as arrowheads. Each topic has its own color. The node 16g is down as indicted by the gray color and the dashed links.

In one embodiment, the visual representation includes a plurality of topics where each topic is distinctly identified. Each topic may be identified by color coding, direction of each topic, line type, a value rating of each topic, a sizing related to the value rating of the topic, type of topic, and/or the like.

For example, the color coding is where a first topic is represented by a first color, a second topic is represented by a second color, and so on. Or, the direction of each topic is illustrated to show a publisher 12a-12z sending a topic, e.g. data, to a subscribers 14a-14z. Or, the line type may be a solid line, a dotted line, a dot/dash line, and/or the like.

In one embodiment, the value rating of each topic is represented as black-to-blue-to-red, or green-to-yellow-to-red (see FIG. 6) where black and/or green represent a first state, blue and/or yellow represent a second state, and red represents a third state of the visually represented relationship between the publisher 12a-12z and the subscriber 14a-14z based upon a given topic. The states of the visually represented relationship are a continuum of delay, for example, where green represents no delay, yellow represents some delay, and red represents total delay. In another embodiment, a green node indicates status up and a gray node indicates status down. In another embodiment, a continued line type signifies a link is up while a dashed line signifies a link is down.

In one embodiment, in order to accommodate the topics on a network link that is too short to draw them as full arrowheads, the system 10 slides them partly over each other. For example, there are five topics on the left half of the link going from Seattle to Denver in FIG. 5. Sliding these arrowheads over each other and hiding their tips, makes them more visible than simply shortening them.

Figure 6:
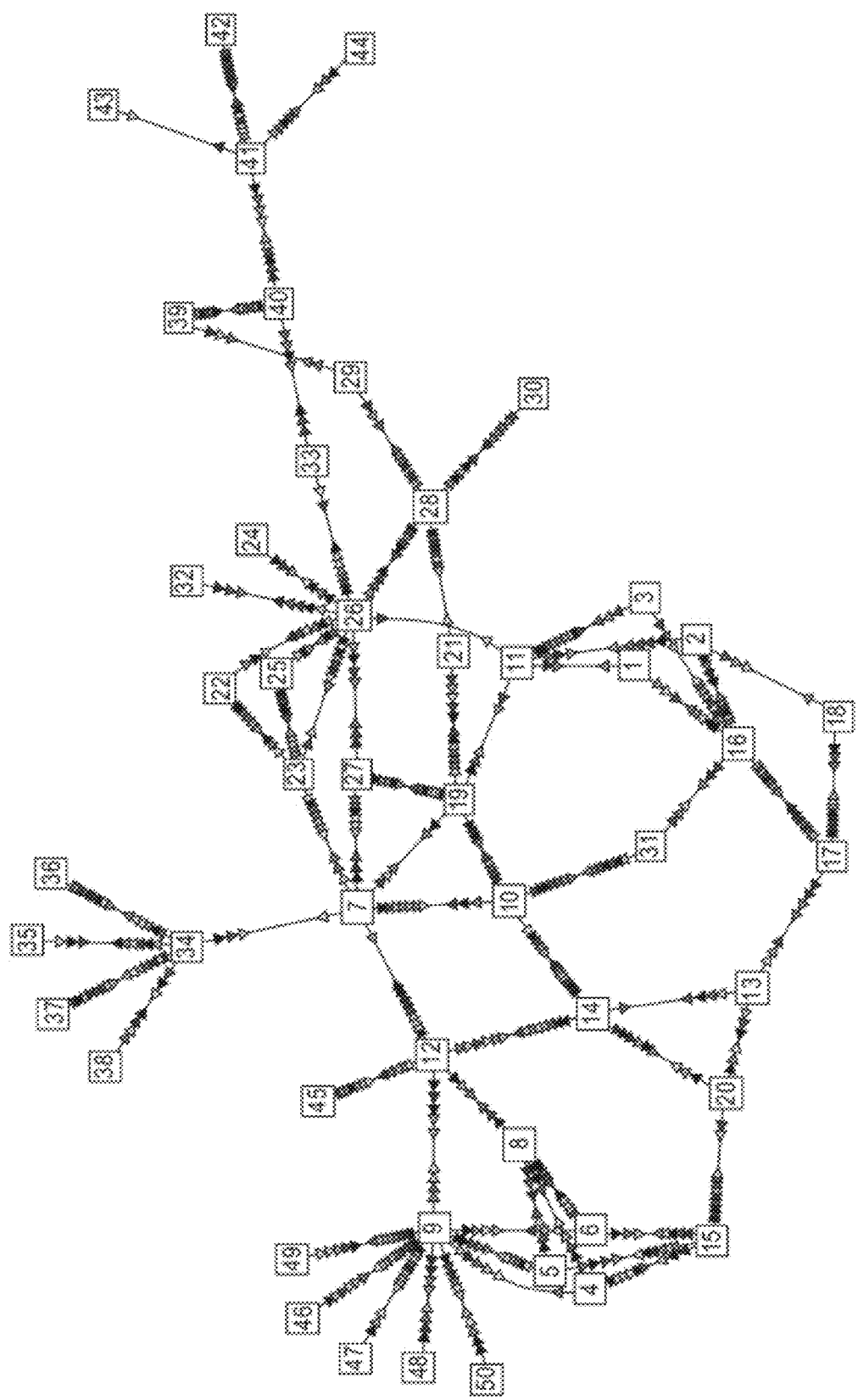
FIG. 6 is a schematic block diagram of another embodiment of the system in FIG. 1.

FIG. 6 shows a more complex topology with 50 nodes. Here, no details are visible, but the picture serves as an overview and frame of reference to the user. The broker 16a-16z nodes only show an index number at this zoom level. The user can mouse over nodes, links and topics, or zoom in to get all the details. Notice that even at this zoom level, all the topics on the links are somewhat visible by drawing the arrowheads over each other.

Figure 7:
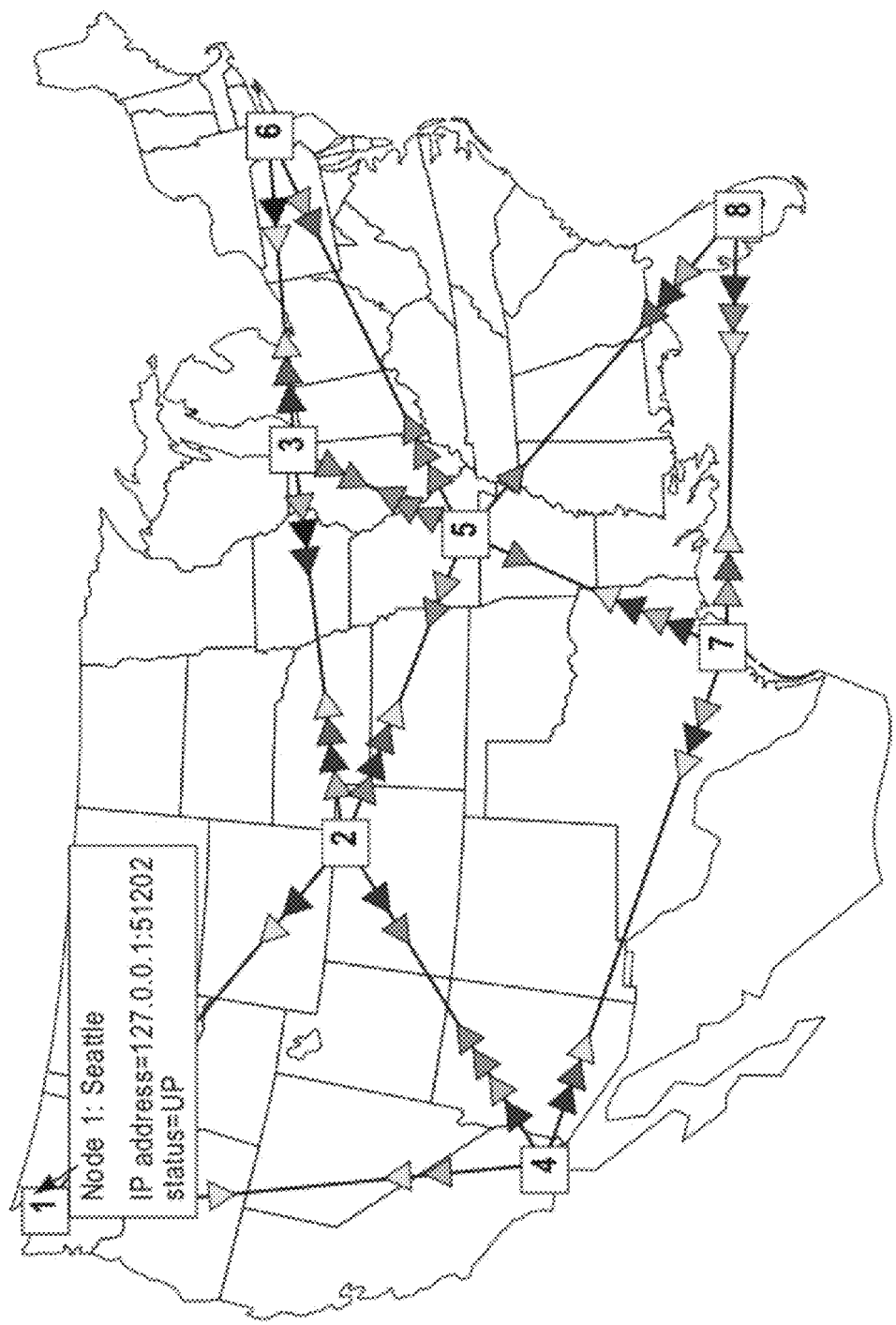
FIG. 7 is a schematic block diagram of another embodiment of the system in FIG. 4.

Some publish/subscribe systems connect applications located in different geographical locations. In this case, the model took into account specific business roles of the brokers 16a-16z, but more importantly, their geographic locations. In order to support this geographic perspective, system 10 provides a second way to layout an overlay network of messaging brokers 16a-16z. Here, the nodes are laid out on a geographic map as illustrated in FIG. 7. Network links are laid out as straight lines, or, if needed, as splines (piecewise polynomial curve) to avoid crossings. In order to easily compare this layout to the classic graph layout, system 10 used the same messaging network as before, but FIG. 7 shows it spanning 8 cities on a map. As is evident from this figure, the layout based on geographic coordinates may not make as efficient use of space as the layout based on spring models or other classic graph layout algorithms. However, hovering with a pointer over nodes and links of interest or zooming and panning can help the user explore the geographic layout.

At any moment a user can hover over artifacts on the screen to get full details in a tooltip, as illustrated in FIG. 7. In one embodiment, when showing a complete network with a large number of brokers 16a-16z, such as the one in FIG. 6, the publication and subscription topics as well as the labels will be hidden. However, as the user zooms in, more details will be revealed.

In one embodiment, the direction of each topic on a communications link 20a-20z includes an arrowhead, and the size of the arrow head indicates a continuum of throughput over a given link 20a-20z. In another embodiment, a thicker line signifies higher aggregate traffic when compared to a thinner line, which signifies lower aggregate traffic.

In one embodiment, any of the foregoing visual representations can be filtered based upon a topic's identification scheme. In other words, a user can select color coding and value rating of each topic and filter out all of the other identifications schemes, for instance.

Filtering the view by topic makes it easier for the user to discern the paths for a specific topic. More specifically, system 10 provides different filtering capabilities such as filter by topic, filter topics by publisher broker, filter topics by subscriber broker, and/or the like.

To illustrate how a publish/subscribe network administrator can untangle the routing mesh with these filtering features, consider the following example. The administrator's plan is to shut down the Seattle broker for maintenance, shown in the example of FIG. 5. In addition, some overlay connections need to be reconfigured between brokers 16a-16z, in particular, some VPN software requires an update. One of the topics published in the network, the brown one, is of special importance and the administrator needs to make several checks regarding the potential side effects of the planned modifications. After starting system 10, the administrator can see a current overview of the complete network, as shown in FIG. 5.

Figure 8:
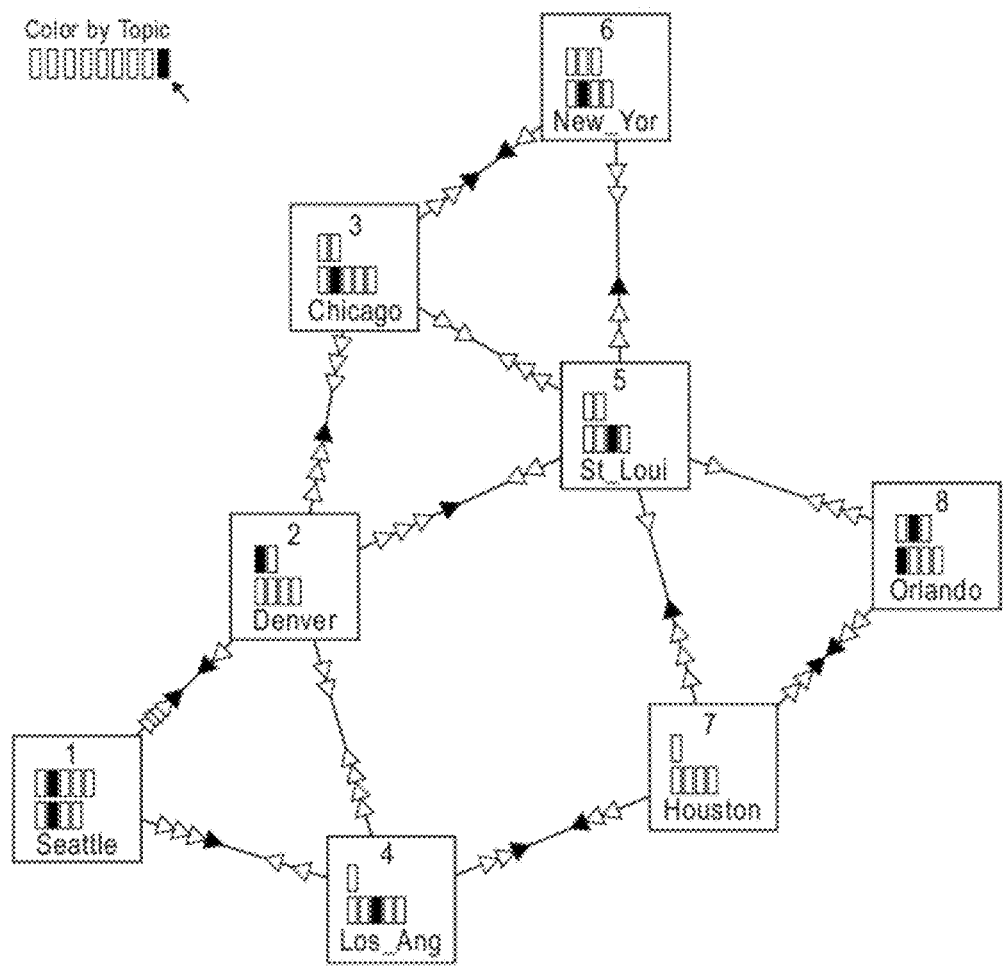
FIG. 8 is a schematic block diagram of another embodiment of the system in FIG. 5.

In order to clearly see which parts of the network are used for the brown topic, the administrator selects the brown topic in the legend on the upper left. The result in FIG. 8 shows that only elements pertaining to the brown topic are now highlighted, more specifically, the brown publication and subscription topics, as well as the brown topic arrowheads on overlay links, and all other elements are grayed out.

This view clearly shows all the brokers that contain a brown publication and subscription topics. Note also that a broker can contain the same topic for publication and for subscription, as illustrated by the Seattle broker node in this example. In order to start the VPN update, the administrator first needs to identify the links that are not carrying the brown topic. Upgrading those links will not interrupt traffic for the brown topic. From the view in FIG. 8, it is easy to see that the St. Louis-Orlando and the St. Louis-Chicago links can easily be upgraded.

As mentioned earlier in the example, the Seattle broker needed to be shut down. To minimize the disruption, the administrator first identifies the individual brokers across the entire mesh, that contain a brown subscription topic and that may be affected by shutting down the Seattle broker. The second filtering feature of the system 10 can offer help with this task, by highlighting only certain topics relating to a specific broker.

Figure 9:
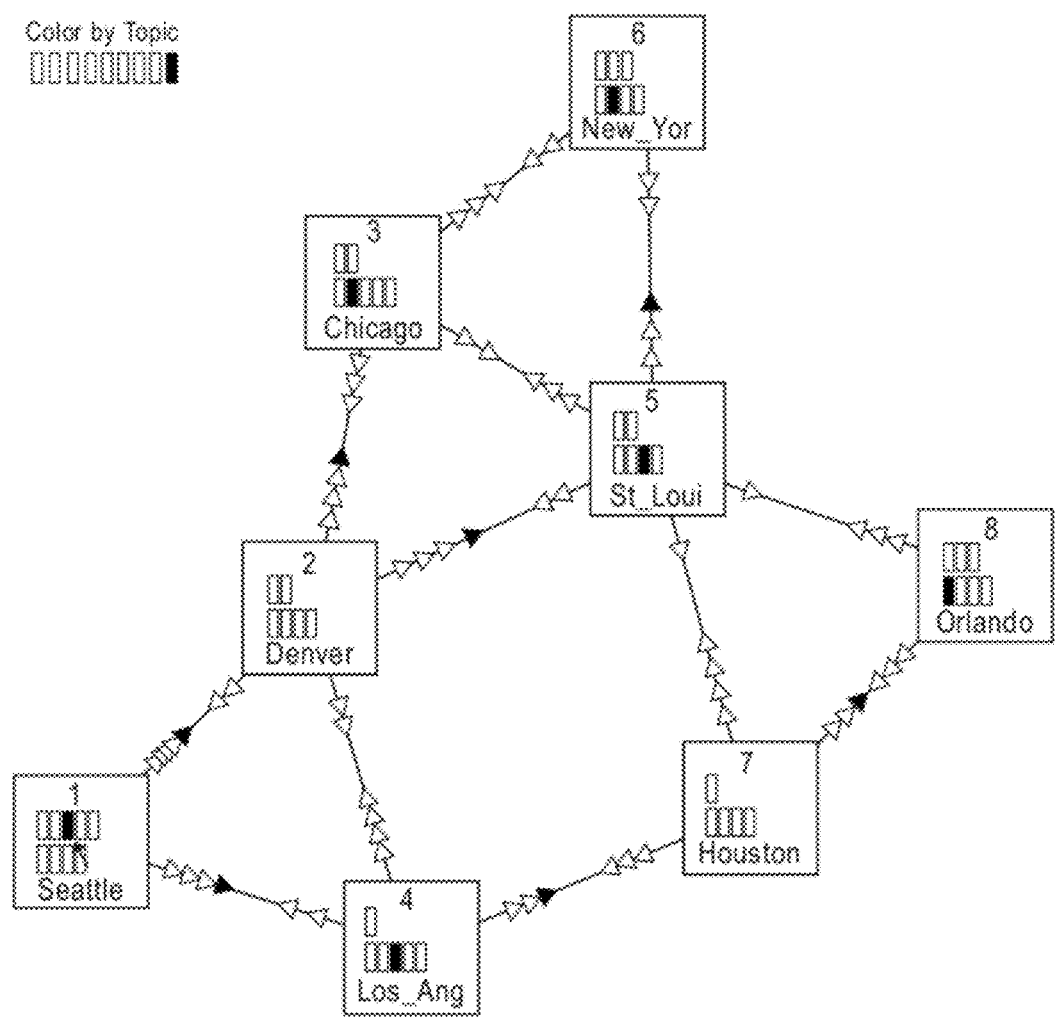
FIG. 9 is a schematic block diagram of another embodiment of the system in FIG. 5.

In FIG. 9, the result of the administrator selecting the brown publication topic inside the upper half of the Seattle broker node. It shows the paths in a tree structure emanating from the Seattle broker, publishing the brown topic, and reaching all brokers subscribing to the brown topic, namely, Los Angeles, Chicago, Orlando, St. Louis and New York. The view in FIG. 9 also helps the administrator by showing which colleagues at the other locations should be notified about the Seattle broker shutdown. These colleagues can then be warned about possible intermittent reception of publications on the brown topic coming from Seattle.

In addition, as already noticed in FIG. 8, Seattle is also a subscribing broker to the brown topic. Therefore, the administrator will need to check which paths that deliver messages to Seattle might also be disrupted.

Figure 10:
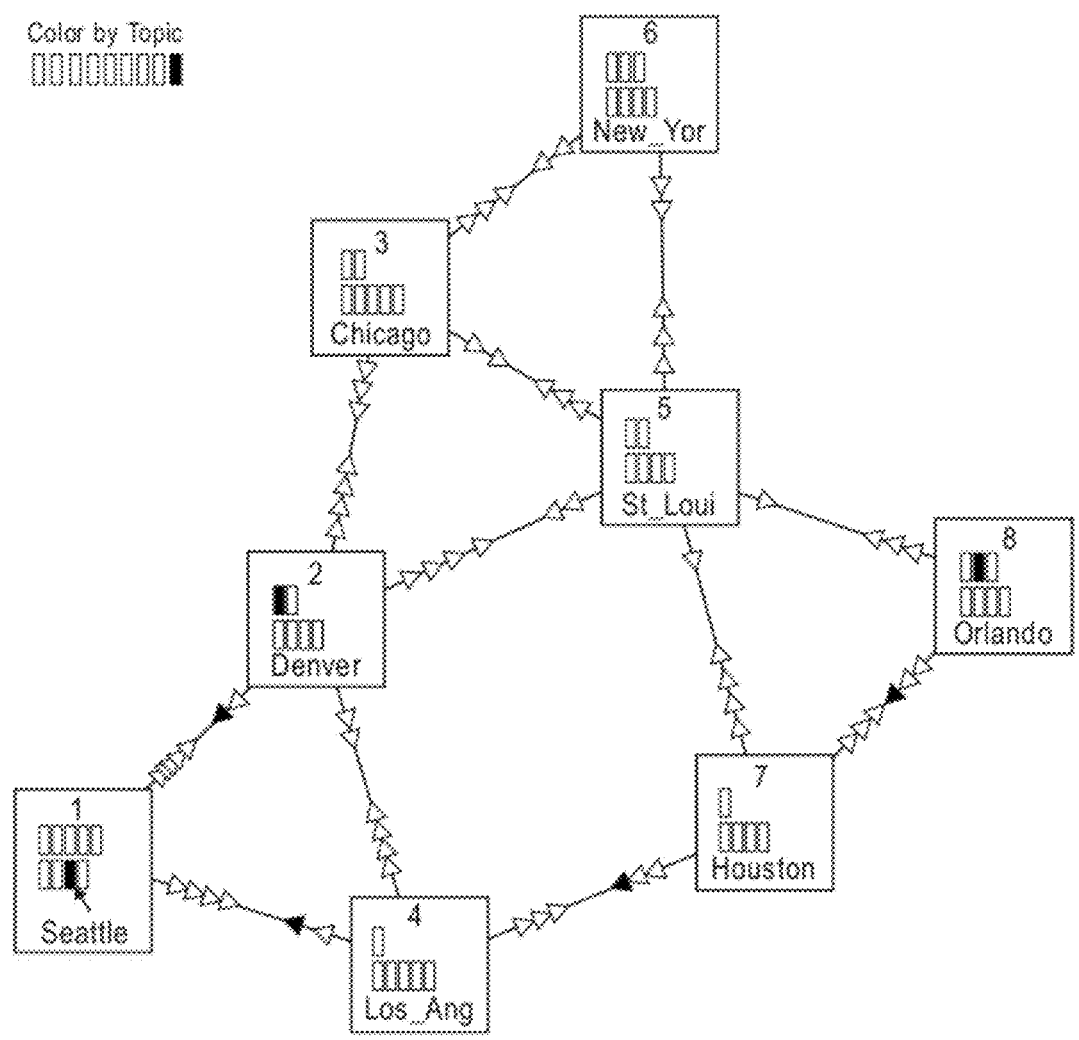
FIG. 10 is a schematic block diagram of one embodiment of the system in FIG. 5.

By selecting the subscribing brown topic (bottom row), the "reverse tree" of all publishing brokers and paths funneled towards Seattle is highlighted as seen in FIG. 10. This scenario illustrates how administrators can perform impact analysis before taking disruptive action. As networks grow, these what-if questions become more challenging in larger networks. For example, the filtering features of system 10 can also help users evaluate disruptions when multiple paths from publishers to subscribers in large networks exist and when traffic drastically shifts from one route to another.

In one embodiment, the broker 16a-16z visually represent the relationship as a statistical representation. In another embodiment, special events produce visualization alerts.

The previous views help the user understand the topology, the topics that are sent over the publish/subscribe network paths, and the status of the links and nodes. In addition to these features, system 10 allows the user to explore performance data of the overlay network.

System 10 is different from the usual network statistics tools because it can show the performance data by topic. By displaying delay and throughput statistics by topic, the tool allows a network administrator or application developer to make informed decisions at a higher level of abstraction than just raw network statistics. The delay and throughput numbers are calculated as averages over the last sample period, which is by default 30 seconds.

While topics are by default colored according to their topic name, the user can turn on "show delay" mode to encode delay as a color, picked from a dichromatic scale. For example, this scale ranges from dark blue, for zero delay, over purple to bright red, for long delays. Publication and subscription topics inside a broker 16a-16z node shows the processing delay for the topic, whereas the topics represented by the arrowheads on a link show the network delay, for instance.

Figure 11:
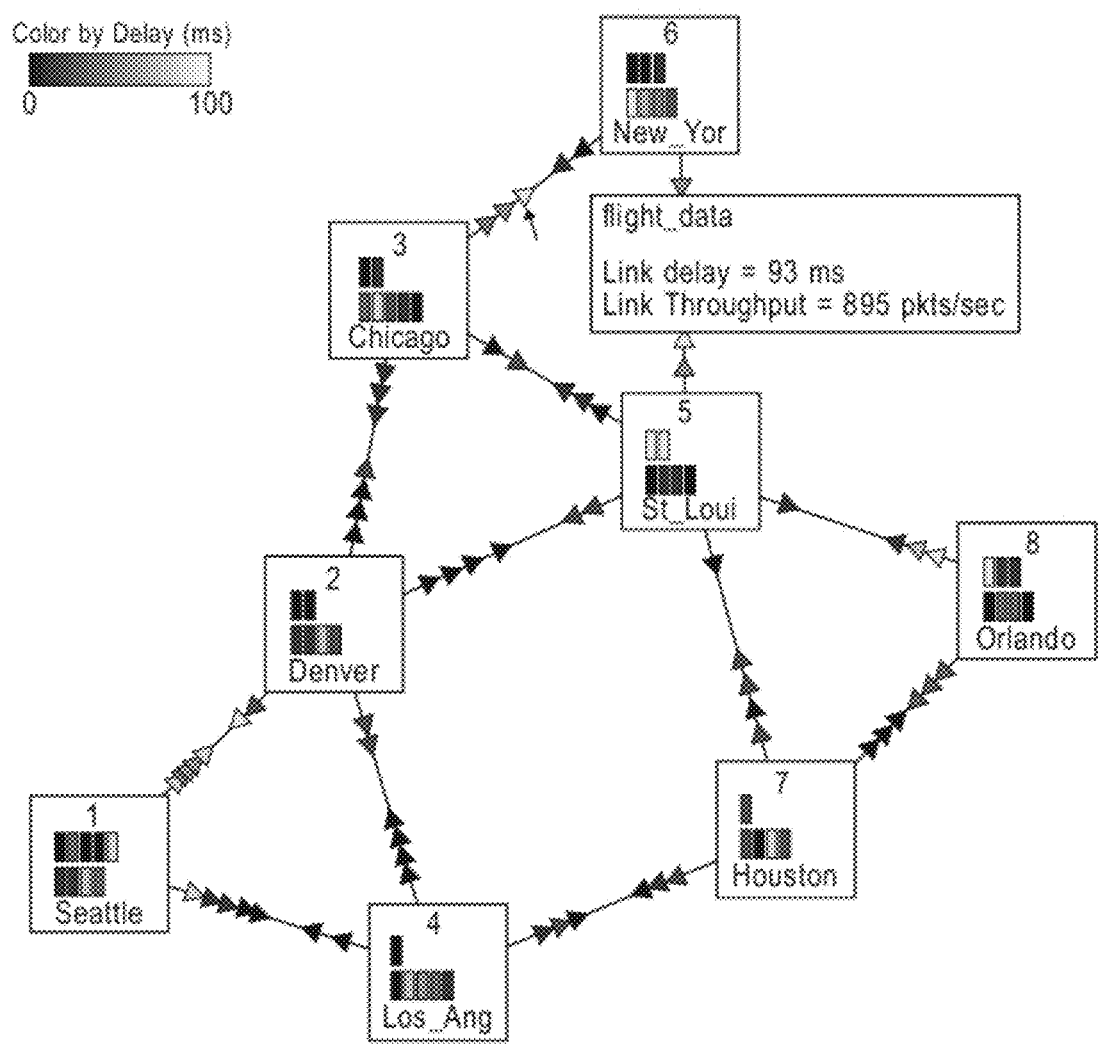
FIG. 11 is a schematic block diagram of one embodiment of the system in FIG. 5.

For example, high delays readily jump out as red alerts, as shown in FIG. 11. While the original topic colors (encoding the categorical data of the topic names) are not visible anymore in this mode, the topics are still in the same position in the broker nodes and on the links. In case of doubt, the user can always mouse over them to see their names. In FIG. 11 for example, the administrator can quickly see that the delay of the "flight_data" topic from Chicago to New York, shown red, is significant. However, the processing delay for this topic, as well as any other topic, inside the Chicago node seems to be low. This suggests that the cause for the delay is the network.

While high values of delays can be a cause for concern, high values for throughput are generally considered desirable. However, in some cases, network administrators may want to detect high throughput values to see which topics are stressing the network. Because high throughput values are not necessarily bad, system 10 does not use the same red alert metaphor that as was used for the delay.

Instead, throughput statistics for topics are encoded as size, when a user turns on "throughput mode". For the publication and subscription topics in the brokers, the variable height of the topic rectangles now reflects their throughputs, as shown for our network example in FIG. 12. For a topic on a network link, the width of the topic's arrowhead encodes the throughput, also shown in FIG. 12, and system 10 keeps the height of the arrowhead, as measured from the tip to its base, constant. In other words, wide arrowheads indicate high throughputs, and narrow arrowheads indicate smaller throughputs.

Figure 12:
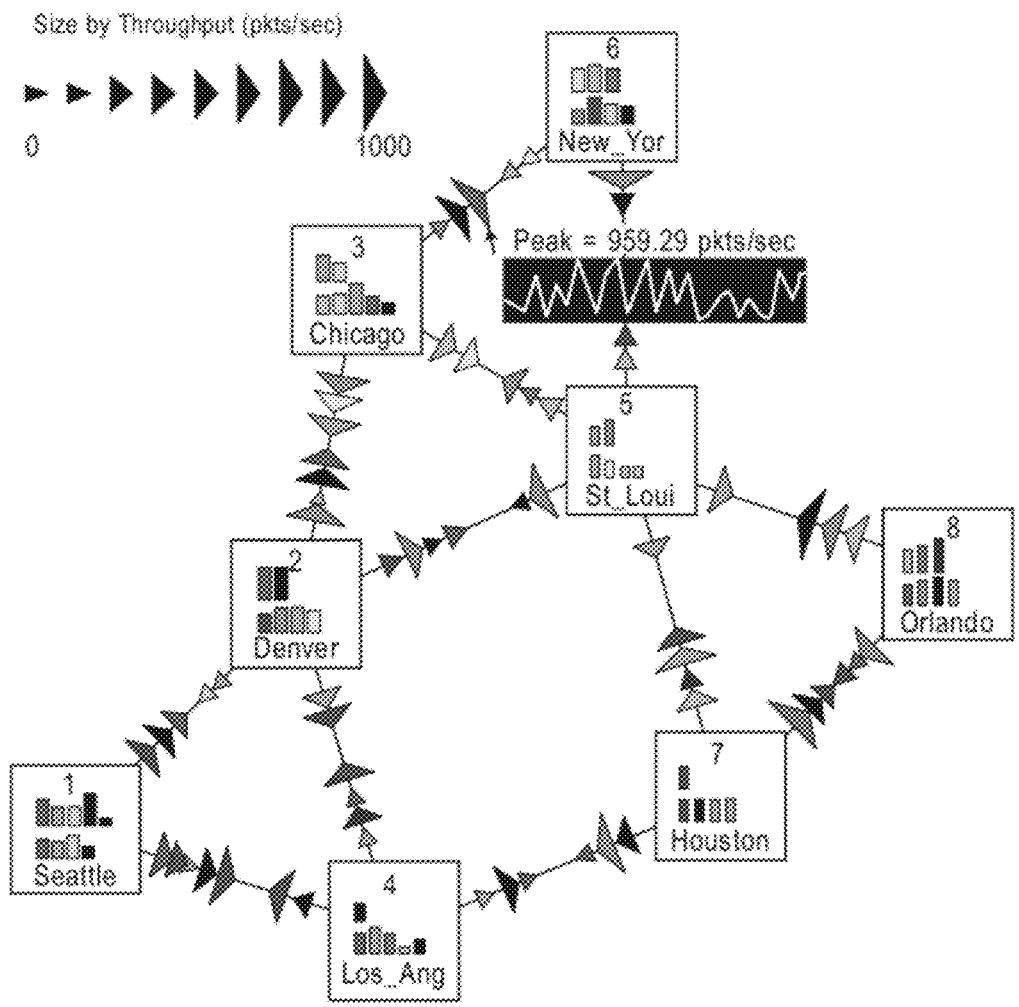
FIG. 12 is a schematic block diagram of one embodiment of the system in FIG. 5.

This view allows an administrator to easily identify the topics that contribute most to the load of each overlay link. The wide brown arrowhead on the link from Chicago to New York in FIG. 12 shows that the brown topic is flooding this link. The combination of this high throughput and a high delay for the same topic, as observed in FIG. 1, sometimes suggests bursty traffic behavior for this topic on the link.

As explained later, system 10 can gather live topology, status, and performance data from a running publish/subscribe system. The statistics are then rendered and refreshed every 30 seconds, for example. This gives a network administrator immediate and actionable information for optimization or troubleshooting a publish/subscribe network. Since the delay and throughput statistics may vary over time, system 10 allows the user to study the temporal character of these transient phenomena.

In order to see any of these statistics for a topic, the user can select the topic and bring up a small sliding sparkline next to the topic, as shown in FIG. 12, and may be static representations. In one embodiment, system 10 updates the sparkline continuously with the most recent value, thus showing the statistics in a sliding window over the past 15 minutes, as well as the peak value for this period.

The sparkline for the brown topic on the link from Chicago to New York reveals that traffic on this topic was not bursty, as suspected earlier, but still highly irregular. This may require the administrator to further investigate the status of that link.

Figure 13:
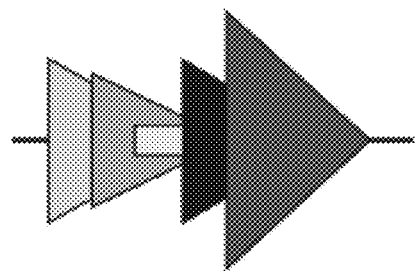
FIG. 13 is a schematic block diagram of a portion of arrowheads of the system in FIG. 5.

The visual technique of sliding the arrowheads over each other for short network links still works well for showing throughputs in dense representations. By sliding the tips of the arrows under their neighboring arrowheads, the base of each arrowhead always remains visible. This way, the user can always infer the throughput for a topic from the width of its arrowhead. FIG. 13 shows a close-up of the topics on the link from Seattle to Los Angeles in FIG. 12. A user can also focus on delay or throughput statistics for just one specific particular topic or one specific path between a publication and subscription topic, by using the filtering techniques described above.

In one embodiment, system 10 is deployed in conjunction with the Harmony publish/subscribe middleware. In another embodiment, system 10 is used to validate the Quality of Service (QoS) features of the Harmony middleware, such as QoS-aware overlay routing and automatic rerouting upon QoS violations.

Figure 14:
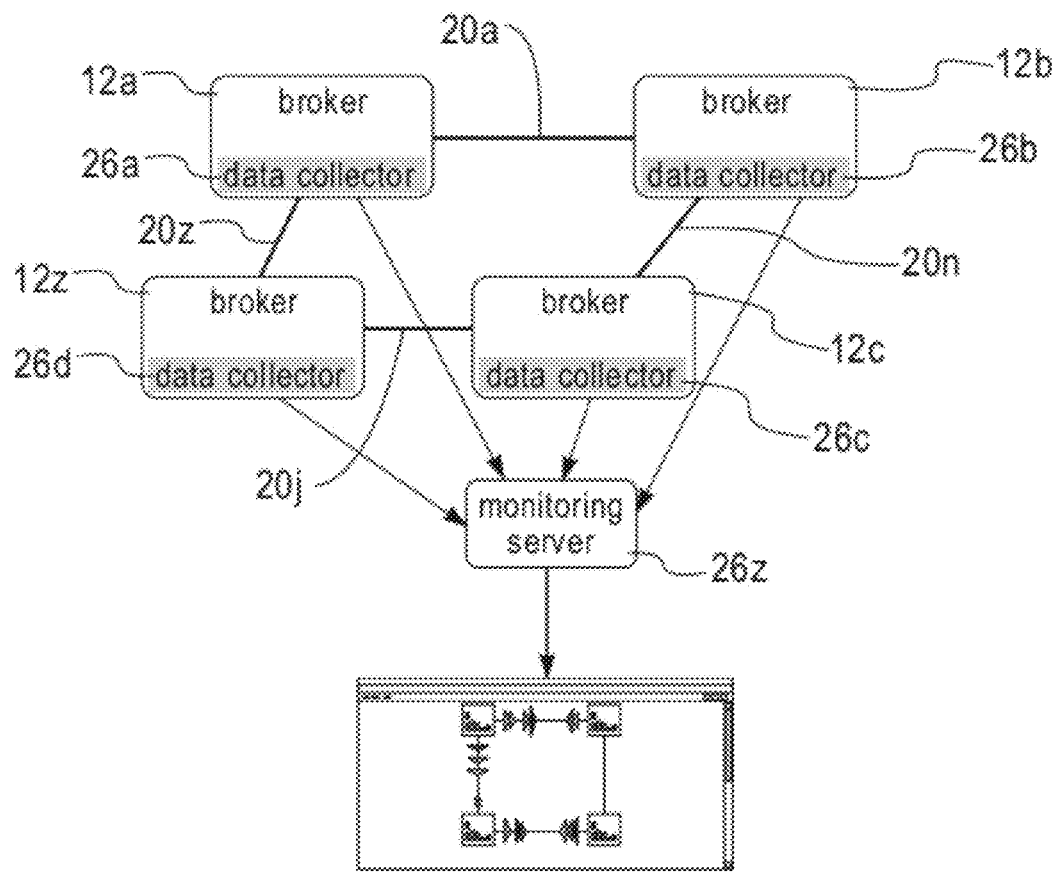
FIG. 14 is a schematic block diagram of the architecture of the data collection and visualization in accordance with the invention.

In one embodiment, system 10's data collection and visualization architecture includes three types of distributed functional components, as shown in FIG. 14. First, data collectors gather the necessary raw data from the messaging brokers. Second, a monitoring server receives and aggregates the data across multiple data collectors. And thirdly, a visualizer turns this data into the interactive views described above.

Each data collector is a light-weight process, started in parallel with each publish/subscribe broker. This process closely monitors the operation of its assigned broker and records two types of information, statistics and topology events. Statistics include data delay and data throughput per topic, network link delay, processing delay processing throughput, and/or the like, for example.

These statistics are recorded and averaged over a configurable sample period. In a particular configuration, this period is set to 30 seconds.

Topology events include network updates, the operational status of brokers, overlay links and current topic paths, and/or the like, for instance. Upon startup, data collectors register with a monitoring server, also shown in FIG. 14, which is provided to the data collectors via a configuration file. Data collectors then push statistics at regular intervals to the monitoring server. Topology data, on the other hand, is pushed to the server as soon as it changes.

Note that there clearly exists a trade-off between data freshness and resource usage when choosing an update frequency of the monitoring server. Statistics updates are delivered as short and compressed UDP-based messages, resulting in minimal overhead on the network and efficient handling at the monitoring server.

In one embodiment, the monitoring server is identified by its unique URI. It provides a remote access API for querying and retrieving the aggregated data. In one implementation, the visualizer, accesses the monitoring server through Java's Remote Method Invocation (RMI).

The design allows visualizers from multiple locations to access the monitoring server simultaneously. This has proven particularly useful to local administrators at each broker location, as they were able to monitor the overlay in real-time. Furthermore, multiple monitoring servers may be accessed through their URIs, thereby allowing management of larger networks.

In one embodiment, each data collector is assigned to one specific monitoring server. However, multiple data collectors may monitor a single broker and therefore report statistics about this broker to multiple servers. This approach offers flexibility in monitoring complex networks.

In particular, a set of monitoring components can be associated with a different collection of interconnected brokers that comprise a broker-monitoring group. This configuration permits system administrators to define particular broker-monitoring groups aligned with business needs. For example, a corporate network with offices on both the West coast and East coast may define two monitoring groups, one on each coast. Furthermore, one can define hierarchical groups, for example a group that includes brokers across different continents and subgroups for countries in each of the continents.

System 10 implements the visualizer as an Eclipse plug-in. This allows publish/subscribe application developers to integrate the messaging visualization in their application development environment and use it as a testing and performance tool. The visualizer connects to the monitoring server via the provided URI and periodically polls the server for statistics and topology updates. The Eclipse Standard Widget Toolkit may be used to render the graphics. For the spring model graph layout, the neato part of Graphviz can be used.

Laying out the network shown in FIG. 6 on a 2.4 GHz Intel Core 2 Duo processor takes about 420 mSec. This layout is performed once, after connecting to the monitoring server, and also, infrequently, when the network topology changes.

In one embodiment, the system 10 also includes an overlay network, e.g. communications links 20a, 20n, 20j and 20f in FIGS. 1-4, linking the publishers 12a-12z, the subscribers 14a-14z, and the brokers 16a-16z. In other words, the overlay network is a portion of the communications system 18 as will be appreciated by those of skill in the art. The system further includes an inspection unit 26a-26z comprising data collectors and at least one monitoring server to monitor message topics sent over the overlay network amongst the publishers 12a-12z, the subscribers 14a-14z, and the brokers 16a-16z.

In one embodiment, the overlay network includes domain groupings. In another embodiment, the domain groupings can be browsed by Uniform Resource Identifier based navigation, hierarchical navigation, and/or collapsible domains.

In one embodiment, the inspection unit collects statistics based upon the message topics. In another embodiment, the statistics are collected per domain and/or domain groupings. In another embodiment, the statistics are collected over the overlay network.

In one embodiment, the system 10 includes an application programming interface to provide monitoring filtering and grouping across domains. In another embodiment, the application programming interface is client-side based and data may be aggregated client-side.

In one embodiment, the filtering is based upon topic only, subscriber topics, publisher topics, particular end-to-end path, and/or particular multipath. In another embodiment, the application programming interface provides alerts based upon special events.

In one embodiment, system 10 targets the session layer such as statistics regarding actual data flows on already established, end-to-end delivery routes. In another embodiment, the system 10 is not concerned with changing those routes.

In one embodiment, system 10 provides aggregated and individual monitoring statistics about published and subscribed topics in any system implementing the above architecture. In another embodiment, system 10 provides aggregated and individual monitoring statistics about potential published and/or transformed/subscribed topics in any system implementing the above architecture.

In one embodiment, system 10 monitors application layer information, gathers statistics about the end to end sessions and/or is concerned with the association of application data to the various topics along overlay routes. In another embodiment, system 10 monitors statistics of what message topic and though which channels the message topic is transported.

The brokers may include an overlay network and/or domain groupings in the visual representation. In other words, system 10 provides monitoring and visualization for an overlay publish/subscribe messaging.

Figure 15:
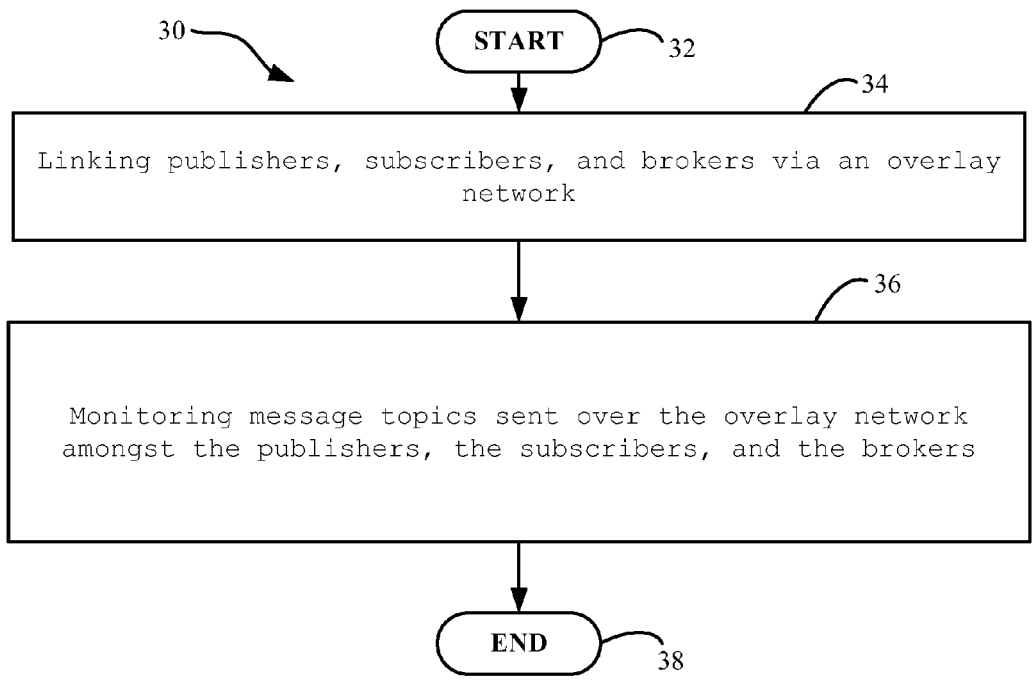
FIG. 15 is a flowchart illustrating method aspects according to the invention.

Another aspect of the invention is a method to monitor an overlay network, which is now described with reference to flowchart 30 of FIG. 15. The method begins at Block 32 and may include linking publishers, subscribers, and brokers via an overlay network at Block 34. The method may also include monitoring message topics sent over the overlay network amongst the publishers, the subscribers, and the brokers at Block 36. The method ends at Block 38.

Figure 16:
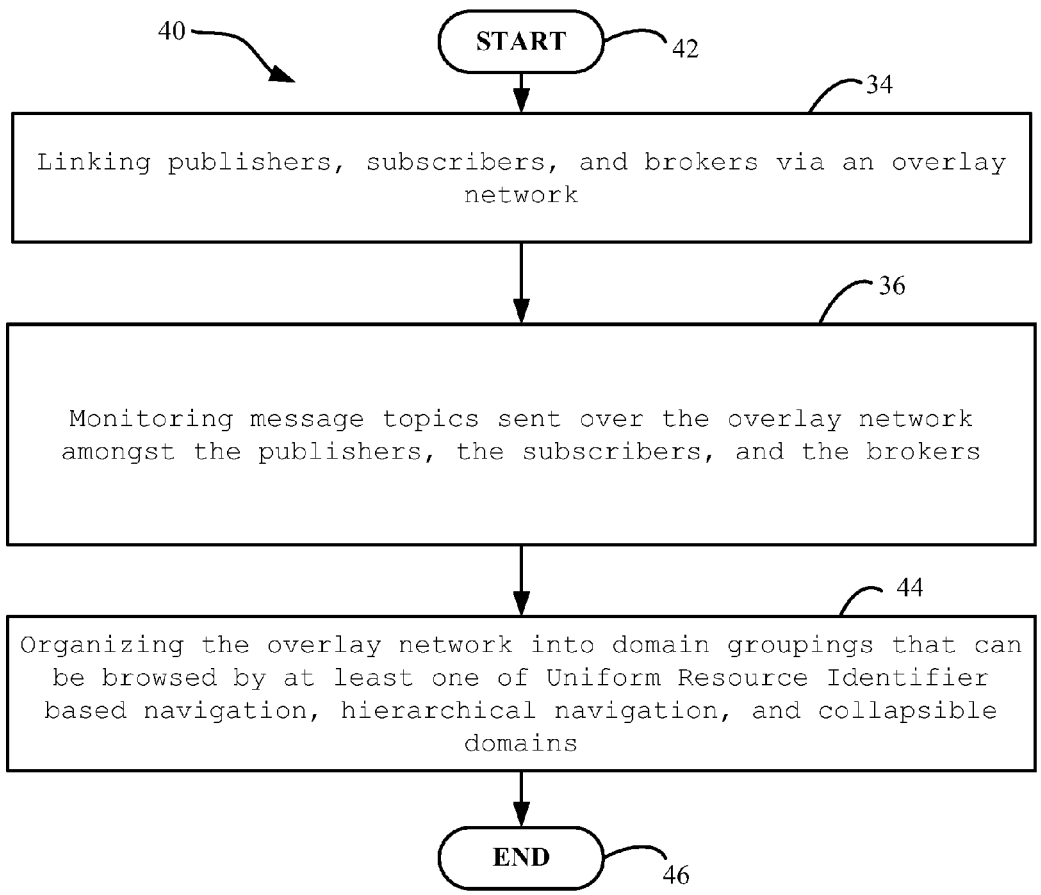
FIG. 16 is a flowchart illustrating method aspects according to the method of FIG. 15.

In another method embodiment, which is now described with reference to flowchart 40 of FIG. 16, the method begins at Block 42. The method may include the steps of FIG. 15 at Blocks 34 and 36. The method may additionally include organizing the overlay network into domain groupings that can be browsed by Uniform Resource Identifier based navigation, hierarchical navigation, and/or collapsible domains at Block 44. The method ends at Block 46.

Figure 17:
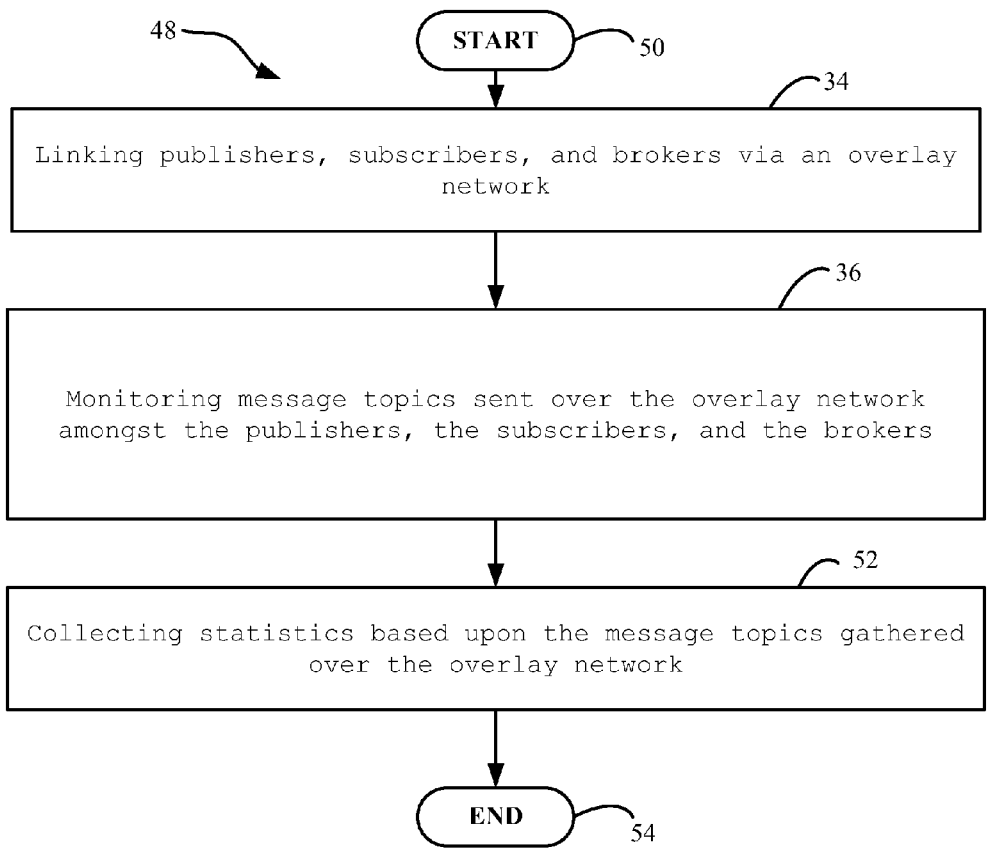
FIG. 17 is a flowchart illustrating method aspects according to the method of FIG. 15.

In another method embodiment, which is now described with reference to flowchart 48 of FIG. 17, the method begins at Block 50. The method may include the steps of FIG. 15 at Blocks 34 and 36. The method may additionally include collecting statistics based upon the message topics gathered over the overlay network at Block 52. The method ends at Block 54.

Figure 18:
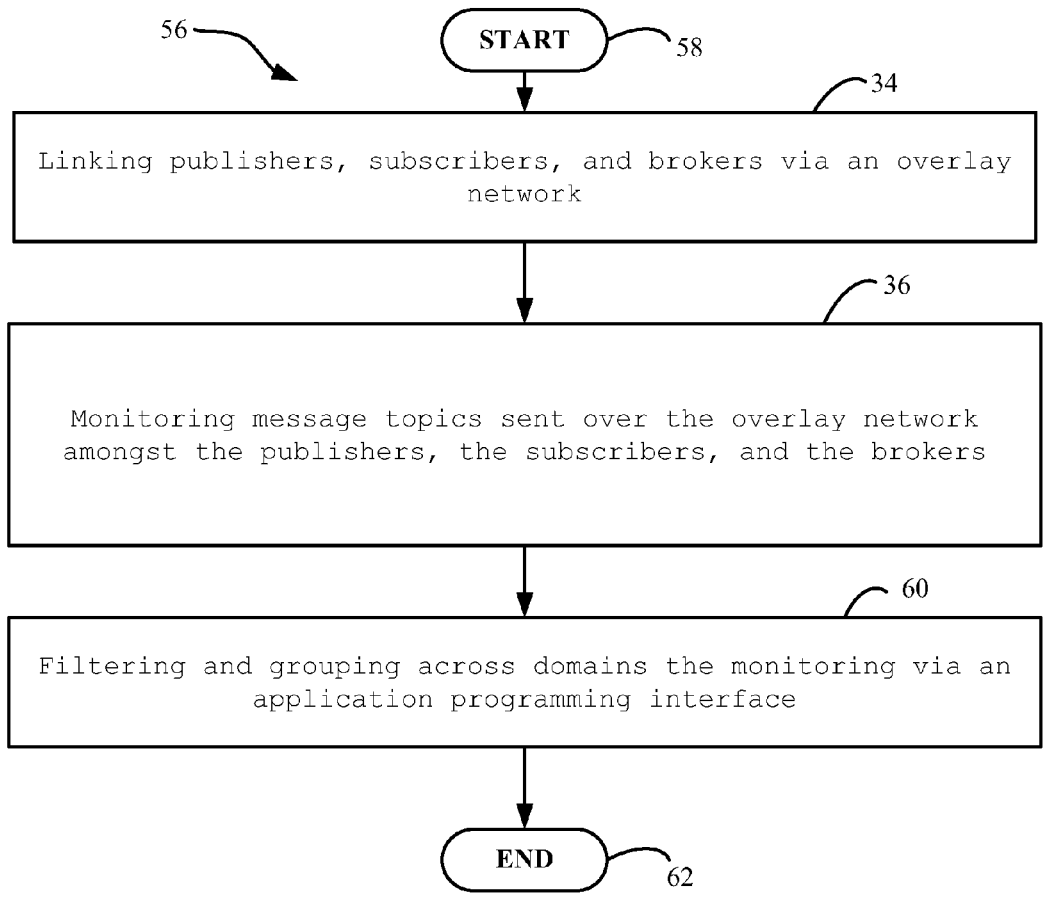
FIG. 18 is a flowchart illustrating method aspects according to the method of FIG. 15.

In another method embodiment, which is now described with reference to flowchart 56 of FIG. 18, the method begins at Block 58. The method may include the steps of FIG. 15 at Blocks 34 and 36. The method may additionally include filtering and grouping across domains the monitoring via an application programming interface at Block 60. The method ends at Block 62.

Figure 19:
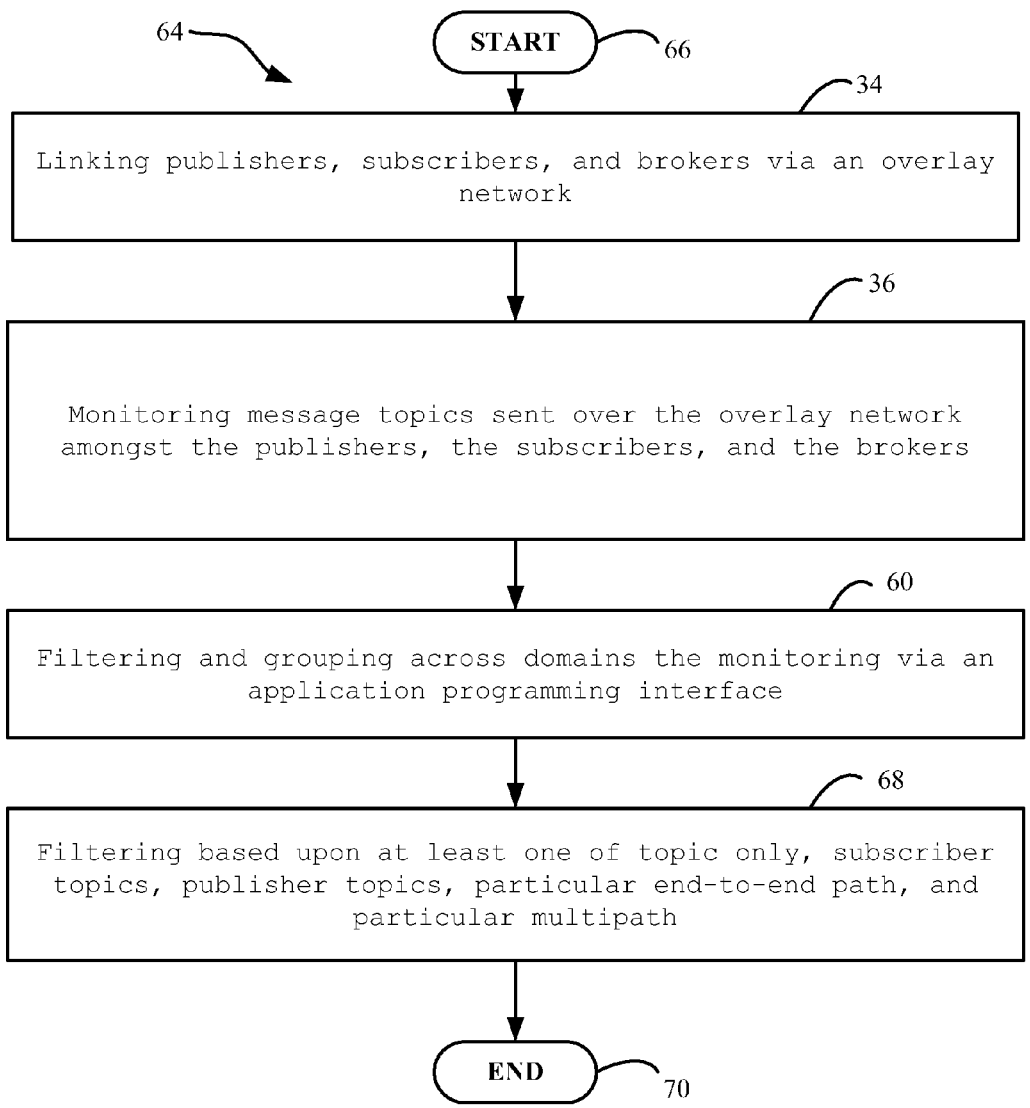
FIG. 19 is a flowchart illustrating method aspects according to the method of FIG. 18.

In another method embodiment, which is now described with reference to flowchart 64 of FIG. 19, the method begins at Block 64. The method may include the steps of FIG. 18 at Blocks 34, 36, and 60. The method may additionally include filtering based upon topic only, subscriber topics, publisher topics, particular end-to-end path, and/or particular multipath at Block 68. The method ends at Block 70.

Figure 20:
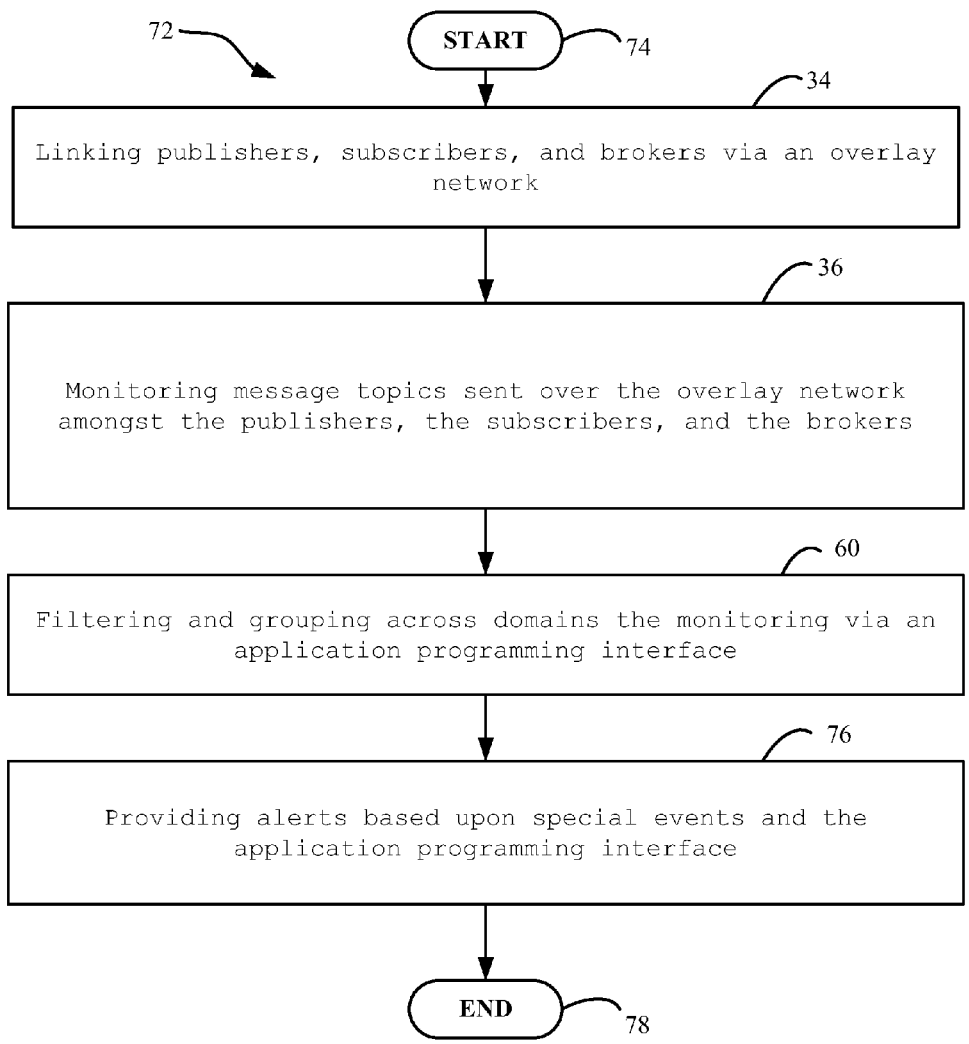
FIG. 20 is a flowchart illustrating method aspects according to the method of FIG. 18.

In another method embodiment, which is now described with reference to flowchart 72 of FIG. 20, the method begins at Block 74. The method may include the steps of FIG. 18 at Blocks 34, 36, and 60. The method may additionally include providing alerts based upon special events and the application programming interface at Block 76. The method ends at Block 78.

Another aspect of the invention is computer readable program codes coupled to tangible media to monitor an overlay network. The computer readable program codes may be configured to cause the program to link publishers, subscribers, and brokers via an overlay network. The computer readable program codes may also monitor message topics sent over the overlay network amongst the publishers, the subscribers, and the brokers.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A system comprising:
an overlay network linking a plurality of publishers, a plurality of subscribers, and a plurality of brokers, the overlay network including a first computer network having a first network protocol carried by a second computer network having a second network protocol; and
the publishers publish message topics over the overlay network to the brokers via overlay paths;
wherein the brokers are configured to route the published message topics across local message domains based upon the message topics travel over a routing mesh created by the publishers rather than final destinations;
a computer processing unit providing an inspection unit to monitor the message topics sent over the overlay network amongst the publishers, the subscribers, and the brokers to collect statistics based upon the message topics gathered over the overlay network.

2. The system of claim 1 wherein the overlay network comprises domain groupings.

3. The system of claim 2 wherein the domain groupings can be browsed by at least one of Uniform Resource Identifier based navigation, hierarchical navigation, and collapsible domains.

4. The system of claim 1 wherein the inspection unit collects statistics based upon the message topics.

5. The system of claim 4 wherein the statistics are collected per at least one of domain and domain groupings.

6. The system of claim 4 wherein the statistics are collected over the overlay network.

7. The system of claim 5 further comprising an application programming interface to provide monitoring filtering and grouping across domains.

8. The system of claim 7 wherein the application programming interface is client-side based and data is aggregated client-side.

9. The system of claim 7 wherein the filtering is based upon at least one of topic only, subscriber topics, publisher topics, particular end-to-end path, and particular multipath.

10. The system of claim 7 wherein the application programming interface provides alerts based upon special events.

11. A method comprising:
linking publishers, subscribers, and brokers via an overlay network, the overlay network including a first computer network having a first network protocol carried by a second computer network having a second network protocol; and
the publishers publish message topics over the overlay network to the brokers via overlay paths;
wherein the brokers are configured to route the published message topics across local message domains based upon the message topics travel over a routing mesh created by the publishers rather than final destinations;
monitoring by an inspection unit the message topics sent over the overlay network amongst the publishers, the subscribers, and the brokers to collect statistics based upon the message topics gathered over the overlay network.

12. The method of claim 11 further comprising organizing the overlay network into domain groupings that can be browsed by at least one of Uniform Resource Identifier based navigation, hierarchical navigation, and collapsible domains.

13. The method of claim 11 further comprising collecting statistics based upon the message topics gathered over the overlay network.

14. The method of claim 11 further comprising filtering and grouping across domains the monitoring via an application programming interface.

15. The method of claim 14 further comprising filtering based upon at least one of topic only, subscriber topics, publisher topics, particular end-to-end path, and particular multipath.

16. The method of claim 14 further comprising providing alerts based upon special events and the application programming interface.

17. A computer program product embodied in a non-transitory computer readable medium comprising:
linking publishers, subscribers, and brokers via an overlay network, the overlay network including a first computer network having a first network protocol carried by a second computer network having a second network protocol; and
the publishers publish message topics over the overlay network to the brokers via overlay paths;
wherein the brokers are configured to route the published message topics across local message domains based upon the message topics travel over a routing mesh created by the publishers rather than final destinations;
monitoring by an inspection unit the message topics sent over the overlay network amongst the publishers, the subscribers, and the brokers to collect statistics based upon the message topics gathered over the overlay network.

18. The computer program product of claim 17 further comprising program code configured to:
organize the overlay network into domain groupings that can be browsed by at least one of an Uniform Resource Identifier based navigation, hierarchical navigation, and collapsible domains.

19. The computer program product of claim 17 further comprising program code configured to:
collect statistics based upon the message topics gathered over the overlay network.

20. The computer program product of claim 19 further comprising program code configured to:
filter and grouping across domains the monitoring via an application programming interface.

* * * * *